Dec. 16, 1941.  C. M. OSTERHELD  2,266,253
OFF-PEAK WATER HEATING SYSTEM
Filed Jan. 30, 1941
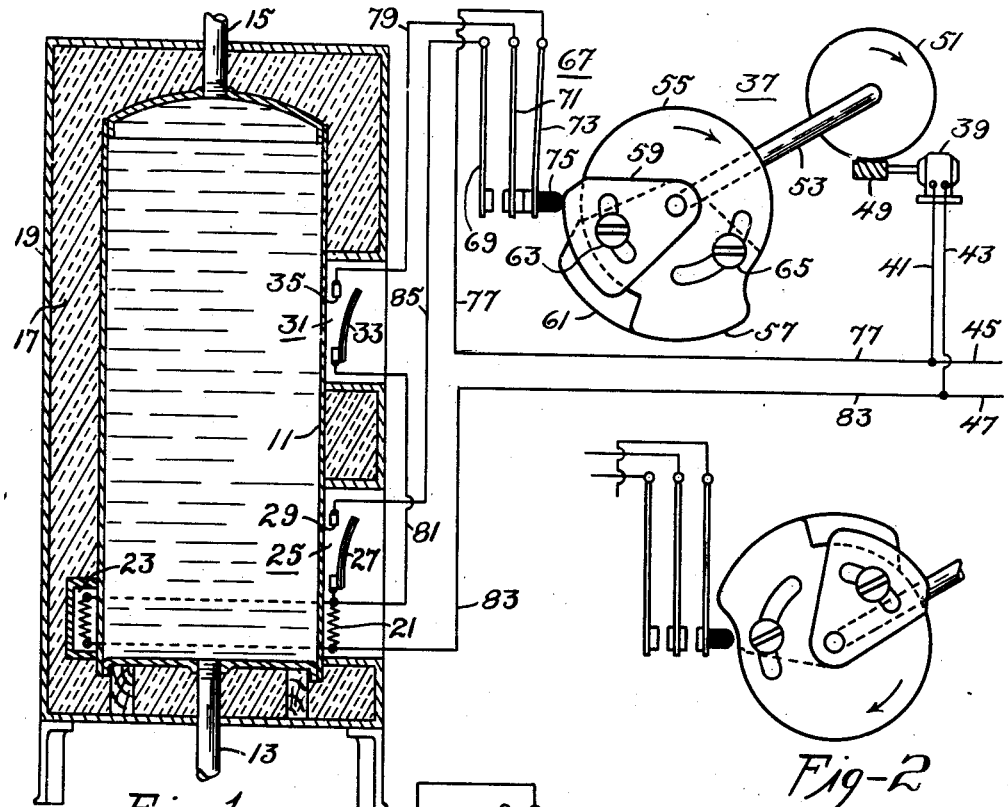
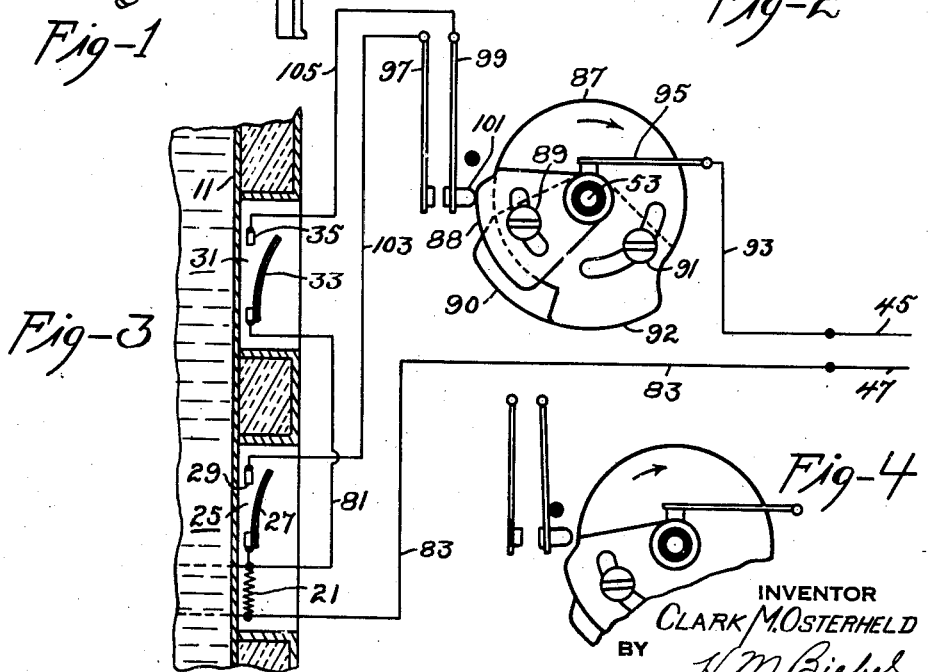
INVENTOR
CLARK M. OSTERHELD
BY
ATTORNEY Patented Dec. 16, 1941

2,266,253

UNITED STATES PATENT OFFICE 2,266,253

OFF-PEAK WATER HEATING SYSTEM

Clark M. Osterheld, Stoughton, Wis., assignor to McGraw Electric Company, Elgin, Ill., a corporation of Delaware Application January 30, 1941, Serial No. 376,579

7 Claims. (Cl. 219—39)

My invention relates to electrical heating systems and particularly to off-peak water heating systems.

An object of my invention is to provide a relatively simple and inexpensive means for controlling the energization of an electric heater applied to a domestic hot water tank to ensure a delay in the energization of said heater after the start of an off-peak period in case more than a predetermined fractional part of the water content of the tank is hot.

Another object of my invention is to provide an off-peak water heating system which will delay energization of the electric heater for an adjustably preset length of time after the start of an off-peak period, will cause energization of said heater in case withdrawal of hot water from the tank occurs during said delay period, will ensure energization of the heater at the end of said delay period in case less than all of the water content of the tank is hot and will cause deenergization of the heater at the end of an off-peak period in case less than all of the water is hot at that time or will cause deenergization of the heater before the end of an off-peak period in case all of the water in the tank is hot before the end of an off-peak period.

Other objects of my invention will either be apparent from a description of several forms embodying my invention or will be pointed out hereinafter and set forth in the appended claims.

In the single sheet of drawings,

Figure 1 is a diagrammatic view of my improved water heating system shown as being associated with a domestic hot water tank, the latter being shown generally in vertical section.

Fig. 2 is a view in front elevation of a part of the timing mechanism shown in a different position than that in which it is shown in Fig. 1 of the drawing, Fig. 3 is a view similar to Fig. 1 but showing a slightly modified system of time controlled means, and, Fig. 4 is a fragmentary view showing a part of the mechanism actuated by the timer in a different position than that in which it is shown in Fig. 3 of the drawing.

I have elected to show my improved off-peak water heating system as applied to a domestic hot water tank 11 shown in Fig. 1 of the drawing as being of the usual elongated cylindrical type. The tank 11 is provided with a cold water inlet pipe 13 and an upper hot water outlet pipe 15, all in a manner now well known in the art. I may also provide a mass 17 of heat insulating material around the tank 11 and hold this in place by a protective outer casing 19.

I provide an electric heater 21 which I preferably mount in a tunnel member 23 near the lower end of the tank but while I have shown such tunnel I do not desire to be limited thereto and instead of using a clamp-on type of electric heater 21, I may use an electric heater which is inserted through the wall of the tank to be located in direct heat-transferring engagement with the water in the tank.

I provide a main thermally-actuable heater control switch 25 located near the lower end of the tank and have shown it as including a bimetal bar 27 having one end thereof fixedly secured to a support which is understood to be in heat-receiving engagement with either the outside of the wall of the tank 11 or with the water within the tank. The flexing bimetal bar 27 is adapted to engage with and be disengaged from a fixed contact member 29, all in a manner well known in the art.

I provide further an auxiliary thermally-actuable heater control switch 31 which may be of substantially the same design and construction as the main thermally-actuable switch and I prefer to locate this auxiliary thermally-actuable switch at an upper intermediate point on the tank. The auxiliary switch 31 includes a bimetal bar 33 the free end of which is adapted to engage with and be disengaged from a fixed contact member 35. I desire it to be understood that my invention is not limited to the use of a bimetal bar in each of the two thermally-responsive heater control switches and that I may use any other similar thermally-actuable switch now on the market effective for the same purpose.

I provide a continuously operative timing means which I have designated by the numeral 37 and this timing means includes an electric motor 39 having its terminals connected by two conductors 41 and 43 to two supply circuit conductors 45 and 47. I may provide a worm wheel 49 on the motor shaft which is adapted to mesh with a worm gear 51 and I desire to point out that I have shown a transmission mechanism generally only and that this mechanism is effective to cause one complete rotation of either the worm gear 51 during each twenty-four hour period or that other mechanism to be hereinafter described and including a cam disc is caused to rotate one complete turn during each twenty-four hour day.

The worm gear 51 is mounted on a shaft 53 and this shaft 53 has mounted thereon a cam disc 55. This cam disc 55 is the one which is to be understood as being so actuated by the transmission mechanism driven by the electric motor 39 as to rotate through one complete turn in twenty-four hours. While I have shown no particular means for securing the disc 55 on the shaft 53, it is to be understood that I may adjustably mount the disc 55 on the shaft 53 and further that the shaft 53 is supported by bearings, all in a manner now well known in the art.

The disc 55 has a uniform outer radius of the greater part of its periphery but is provided with a portion 57 of uniform but larger outer radius than the rest of the disc 55.

The disc 55 has adjustably mounted thereon two cams numbered 59 and 61 respectively. The outer radius of the auxiliary cam surface 61 is substantially the same as is the outer radius of the portion 57 of the disc 55. The outer radius of the cam surface 59 is intermediate between the outer radius of the major portion of the disc 55 and the outer radius of the portion 57 and of the cam surface 61. It is to be noted that both cam surfaces 59 and 61 are adjustably mounted adjacent one and preferably the outer side or surface of disc 55 on the shaft 53. A manually adjustable set screw 63 and a second manually adjustable set screw 65 permit of effecting desired peripheral adjustments of the two cams 59 and 61 relatively to each other and to the portion 57 of cam disc 55.

I provide further a plural contact arm switching means 67 including a left-hand outer contact arm 69, an intermediate contact arm 71 and a right-hand outer contact arm 73, which latter has a lug 75 of electric-insulating material on its free end adapted to engage the surfaces of cams 59, 61 and of projection 57 as the cam disc and the parts mounted thereon are turned by the electric motor 39.

The supply circuit conductor 45 is connected by a conductor 77 with contact arm 73. Contact arm 71 is connected by a conductor 79 with fixed contact member 35 of the upper auxiliary thermally-actuable switch 31. The fixed end of bi-metal bar 33 is connected by a conductor 81 with one terminal of the heater 21 as well as with the fixed end or support for bimetal bar 27. The other end of heater 21 is connected by a conductor 83 with the other supply circuit conductor 47. Contact arm 69 is connected by a conductor 85 with a fixed contact member 29 of the lower main thermally-actuable switch 25.

The position of the cam disc 55 and of the auxiliary cam surfaces mounted thereon are shown in Fig. 1 of the drawing in the positions they will occupy just after the start of an off-peak period. For information, it may be here noted that an off-peak period may be considered to be eight hours long and start at 10 P. M. and end at 6 A. M. However, I do not desire to be limited to such length of off-peak period nor to the starting and stopping time thereof since it is within the province of the engineers of a power station to determine for themselves just when their off-peak periods start and stop. The time extent of an off-peak period is that of the surface of portion 57 plus that of the auxiliary cams 59 and 61, while the time extent of an on-peak period is the rest of the peripheral portion of cam disc 55.

It will be noted that contact arms 71 and 73 are in engagement with each other since lug 75 is now engaged with the outer peripheral surface of the cam member 59. This provides an energizing circuit through the heater substantially as follows: from supply circuit conductor 45 through conductor 77, through contact arms 73 and 71, through conductor 79 and from there through the fixed contact member 35 and the bimetal bar 33 in engagement therewith under certain operating conditions, from there through conductor 81 and heater 21 and from there through conductor 83 to the other supply circuit conductor 47. The hereinbefore mentioned operating condition is that the upper auxiliary thermally-actuable switch 31 is responsive to cold water and that therefore a certain predetermined fractional part of the water content of the tank is cold, this amount of cold water being such as to extend above the auxiliary and upper thermal switch 31.

If, on the other hand, the start of an off-peak period with attendant movement of contact arms 73 and 71 into engagement with each other occurs when more than said predetermined fractional part of the water content of the tank is hot, the bimetal bar 33, or its equivalent, will have caused opening of the upper thermal switch and there will therefore be no energization of the heater 21 which energization is delayed an adjustably preset length of time, as will be hereinafter pointed out.

Should energization of the heater 21 occur at the start of an off-peak period and should said predetermined fractional part of the water content become hot during the hereinbefore mentioned delay period, the thermal switch 31 will cause deenergization of the heater because it will then be subjected to hot water.

Let it be assumed that there is sufficient hot water in the tank at the start of an off-peak period to call for a delay in the energization of the heater. Then when lug 75 on contact arm 73 engages with contact surface 61, the two contact arms 73 and 71 still in engagement with each other will be moved in such direction that contact arm 71 will engage contact arm 69 whereby the following energizing circuit through the heater will be closed under the condition that less than all of the water in the tank is hot at that time. From supply circuit conductor 45 through conductor 77 through the contacts on contact arms 73, 71 and 69, through conductor 85, the closed lower thermal switch 25, the heater 21 and from there through the conductor 83 to the other supply circuit conductor 47.

It is, therefore, obvious that the heater will be energized at the end of said delay period irrespective of whether a certain predetermined fractional part of the water content of the tank is hot or cold so long as less than all of the water in the tank is hot with attendant closure of the main thermally actuable switch 25.

It is further obvious that energization of the heater 21 after said delay period will continue either until all of the water in the tank is hot, whereupon the main thermal switch 25 will cause interruption of the heater circuit before the end of the off-peak period or that energization of the heater will continue until the lug 75 moves off the surface of portion 57 at the end of the off-peak period. The position of the cam disc and the cam surfaces and of the main heater control switches actuated thereby is shown in Fig. 2 of the drawing.

Referring now to Fig. 3 of the drawing, I have there illustrated a slightly modified system embodying my invention using substantially the same main and auxiliary thermally-actuable heater control switches. The main change is in the cam disc and the brushes controlled thereby. A cam disc 87 is insulatedly mounted on shaft 53 and is provided with a first auxiliary cam member 88 held in adjustably selected position against the outer face of disc 87 by a set screw 89. The major portion of the outer radius of cam disc 87 is uniform but a portion 92 is of larger outer radius. A second auxiliary cam member 90 is held adjustably against the inner face of cam disc 87 by a set screw 91. The time extent of the peripheral surfaces of the members 88, 90 and 92 is that of an off-peak period while the time extent of the portion 87 is that of an on-peak period.

The supply circuit conductor 45 is connected through a conductor 93 with a contact brush 95 which is in electrical contact with a part of the main cam disc 87 or of the cam surface 88. Instead of using a contact brush, I may connect the conductor 93 to a fixed metal part of the timer, suitable insulation being of course, provided for the other parts of the structure.

I provide two main time controlled heater switches or contact arms 97 and 99 normally out of engagement with each other and with the motor driven cam disc 87 and the cam surfaces 88, 90 and 92 during all of an on-peak period. The brush arm 99 is provided with a brush or contact member 101 whereby it may electrically engage the outer surface of auxiliary cam surfaces 88 and 90 or the outer surface of portion 92, it being understood that the cam disc and the auxiliary parts thereon are of electric conducting material.

Contact arm 97 is connected by a conductor 103 with fixed contact member 29 of the main thermally actuable heater switch. Contact arm 99 is connected by a conductor 105 with fixed contact member 35 of the upper thermal switch 31.

Let it be assumed that the time is such that the cam disc 87 and the associated parts have been moved into substantially the position shown in Fig. 3 of the drawing, that is, it is just after the start of an off-peak period. A circuit through heater 21 will have been provided in case more than a predetermined fractional part of the water content of the tank is cold so that the upper thermally-actuable switch 31 is subject to cold water. This heater energizing circuit is as follows: from supply circuit conductor 45 through conductor 93, contact arm 95, cam 88, brush 101, contact arm 99 conductor 105, through the upper thermally actuable switch 31, through conductor 81 and through heater 21 and conductor 83 to the other supply circuit conductor 47. As was hereinbefore stated in connection with Fig. 1 of the drawing, if the upper bimetal bar 33 should happen to be in the position shown in Fig. 3 of the drawing, that is, subject to hot water, the above described energizing circuit through the heater would not be provided and energization of the heater would be delayed for an adjustably preset length of time depending upon the relatively angular positions of cam surface 88 and the cam 90. It is to be further noted that should energization of the heater start at the start of an off-peak period and should the water be heated to such an extent that the auxiliary thermally-actuable switch 31 is subject to hot water, the bimetal bar 33 would interrupt the heater energizing circuit, should this occur during the delay period.

Upon engagement of brush contact 101 with the portion 90 after said delay period contact arm 99 will be moved into engagement with contact arm 97 whereupon the following heater energizing circuit will be closed: From supply circuit conductor 45 through conductor 93, contact arm 95, cam member 90 through contact brush 101 into the second contact member 97 through conductor 103 through the lower thermally actuable switch 25 and from there through the heater 21 and conductor 83 to the other supply circuit conductor 47.

It will be noted that the operation of the system shown in Figs. 3 and 4 of the drawing is substantially the same as that shown in Figs. 1 and 2 of the drawing and already hereinbefore described.

The system embodying my invention thus provides an off-peak water heating system embodying a minimum number of parts effective for delaying energization of the heater on a hot water tank for an adjustably preset length of time in case more than a predetermined fractional part of the water content of a tank is hot after the start of an off-peak period and for causing energization of said heater after said delay period in case less than all of the water content of the tank is hot. Deenergization of the heater during that part of the off-peak period after said delay period is effected either in accordance with time or in accordance with temperature depending upon whether less than all of the water in the tank is hot at the end of an off-peak period or not.

Various modifications may be made in the system embodying my invention without departing from the spirit and scope thereof and I therefore desire that all such modifications as are clearly covered by the appended claims shall be included as a part of my invention.

I claim as my invention:

1. In an off-peak water heating system for a hot water tank having a single electric heater near the bottom of the tank, said system including a clock, a cam disc driven by said clock, a plurality of switch arms normally out of engagement with each other during an on-peak period and adapted to be moved into engagement with each other by said cam disk, a plurality of thermally-actuable heater control switches and electric connections between said switch arms, said switches and said heater to cause a preset delay in the energization of said heater after the start of an off-peak period in case more than a predetermined fractional part of the water content of the tank is hot and to cause energization of said heater after said delay period in case substantially less than all of the water content of the tank is hot.

2. In an off-peak water heating system for a hot water tank having a single electric heater near the bottom of the tank, said system including a clock, a cam disc driven by said clock, a plurality of switch arms normally out of engagement with each other during an on-peak period and adapted to be moved into engagement with each other by said cam disk, a plurality of thermally-actuable heater control switches and electric connections between said switch arms, said switches and said heater to cause energization of said electric heater at the start of an off-peak period in case more than a predetermined fractional part of the water content of the tank is cold and for delaying energization of said heater a preset length of time in case more than said predetermined fractional part of the water content of the tank is hot and remains hot during said delay time.

3. In an off-peak water heating system for a hot water tank having a single electric heater near the bottom of the tank, said system including a clock, a cam disc driven by said clock, a plurality of switch arms normally out of engagement with each other during an on-peak period and adapted to be moved into engagement with each other by said cam disk, a plurality of thermally-actuable heater control switches and electric connections between said switch arms, said switches and said heater to cause a preset delay in the energization of said heater after the start of an off-peak period in case more than a predetermined fractional part of the water content of the tank is hot and to cause energization of said heater during said delay period in case withdrawal of hot water from the tank reduces the quantity of hot water therein to less than said predetermined fractional part of the total.

4. In an off-peak water heating system for a hot water tank having a single electric heater near the bottom of the tank, said system including a clock, a cam disc driven by said clock, a plurality of switch arms normally out of engagement with each other during an on-peak period and adapted to be moved into engagement with each other by said cam disk, a plurality of thermally-actuable heater control switches and electric connections between said switch arms, said switches and said heater to cause a preset delay in the energization of said heater after the start of an off-peak period in case more than a predetermined fractional part of the water content of the tank is hot, to cause energization of said heater after said delay period in case substantially less than all of the water content of the tank is hot, to cause deenergization of said heater at the end of an off-peak period in case less than all of the water in the tank is hot at the end of an off-peak period and for causing deenergization of said heater before the end of an off-peak period in case all of the water in the tank is hot before the end of an off-peak period.

5. In an off-peak water heating system for a hot water tank having a single electric heater near the bottom of the tank, comprising a continuously operative timer, a cam disc driven by said timer, three switch arms out of engagement with each other and with said cam disc during an on-peak period and moved into engagement with each other in predetermined sequence during an off-peak period by said cam disc, a main and an auxiliary thermally-actuable heater control switch located at different heights on the tank and electric connections between said timer actuated switch arms, said thermally-actuable switches and said electric heater for causing energization of said heater at the start of an off-peak period in case the upper thermally-actuable switch is responsive to cold water and for delaying energization of said heater for an adjustably preset length of time after the start of an off-peak period in case said upper thermally-actuable switch is responsive to hot water and remains so responsive during said preset length of time.

6. In an off-peak water heating system for a hot water tank having a single electric heater near the bottom of the tank, comprising a continuously operative timer, a cam disc driven by said timer, three switch arms out of engagement with each other and with said cam disc during an on-peak period and moved into engagement with each other in predetermined sequence during an off-peak period by said cam disc, a main and an auxiliary thermally-actuable heater control switch located at different heights on the tank and electric connections between said timer actuated switches, said thermally-actuable switches and said electric heater for causing energization of said heater at the start of an off-peak period in case more than a predetermined fractional part of the water content of the tank is cold and for causing deenergization of said heater in case more than said predetermined fractional part of the water content of the tank becomes hot within a predetermined initial fractional part of an off-peak period.

7. In an off-peak water heating system for a hot water tank having a single electric heater, comprising a continuously operative timer, a cam disc driven by said timer, a brush in electrical engagement with said cam disc, a pair of contact arms out of engagement with each other and out of electrical engagement with said cam disc during an on-peak period and adapted to operatively engage said cam disc in predetermined time sequence during an off-peak period, a main and an auxiliary thermally-actuable heater control switch located at different heights on said tank and electric connections between said heater, said thermally-actuable switches, said brush and said contact arms to delay energization of said heater for an adjustably preset length of time after start of an off-peak period in case more than a predetermined fractional part of the water content is hot at the start of said off-peak period and remains hot during said delay period and to cause energization of said heater at the end of said delay period in case less than all of the water content of the tank is hot at the end of said delay period.

CLARK M. OSTERHELD.